March 28, 1950     F. T. GROTHOUSE     2,502,148
RADIANT PANEL HEATING APPLIANCE
Filed April 5, 1949                               4 Sheets-Sheet 1
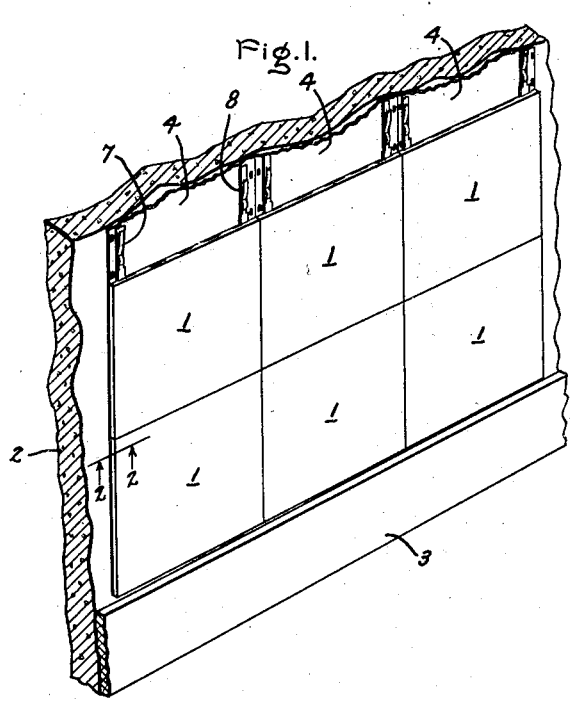
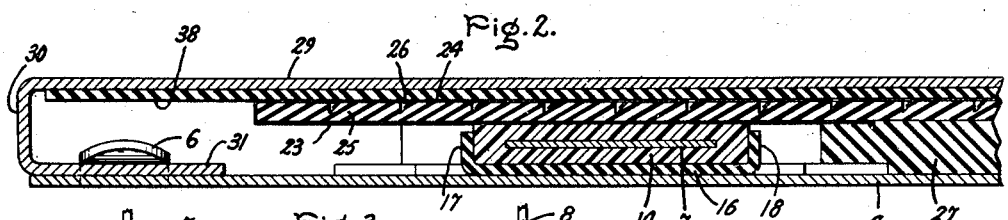
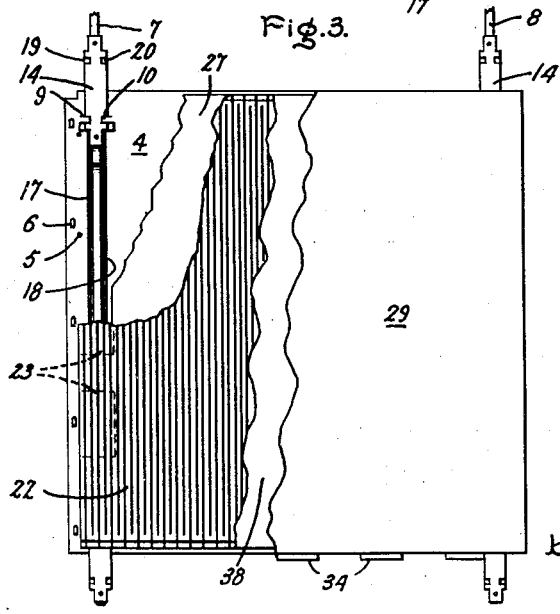
Inventor:
Frank T. Grothouse,
by *Sheridan to Boggs*
His Attorney.

March 28, 1950  F. T. GROTHOUSE  2,502,148
RADIANT PANEL HEATING APPLIANCE
Filed April 5, 1949  4 Sheets-Sheet 2
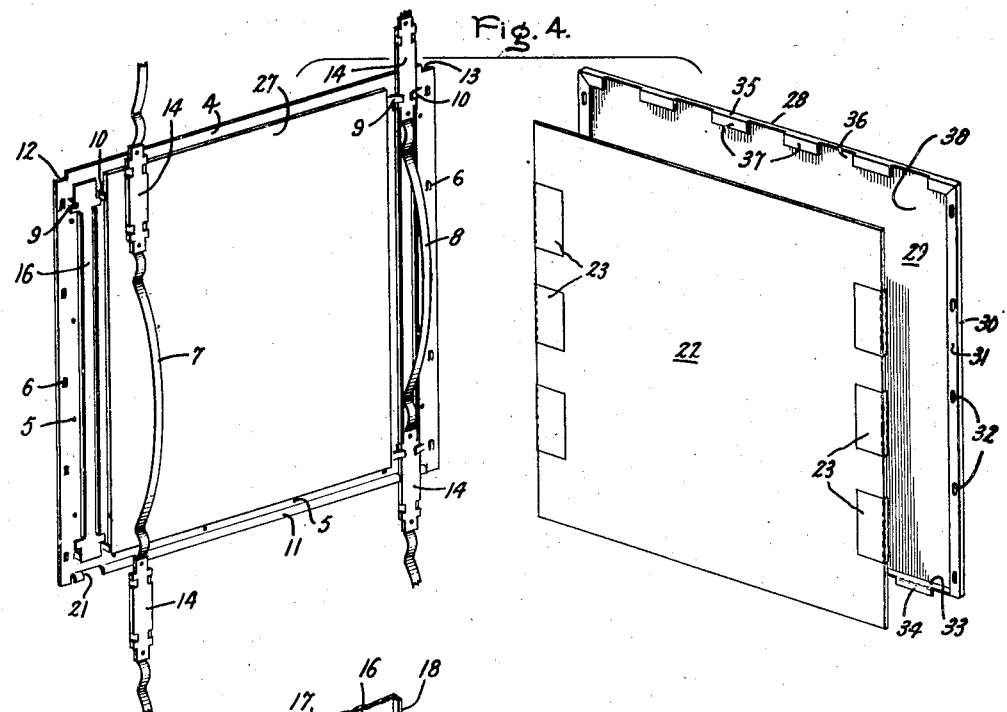
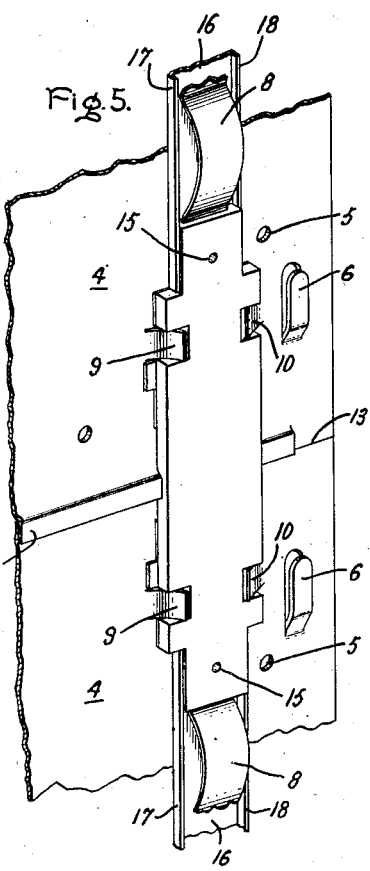
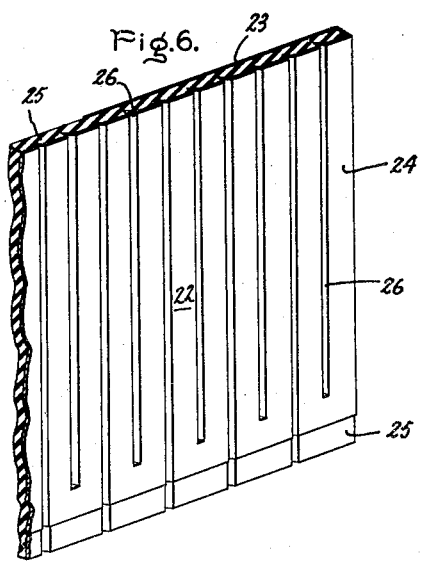
Inventor:
Frank T. Grothouse,
by His Attorney.

March 28, 1950 F. T. GROTHOUSE 2,502,148
RADIANT PANEL HEATING APPLIANCE
Filed April 5, 1949 4 Sheets-Sheet 3
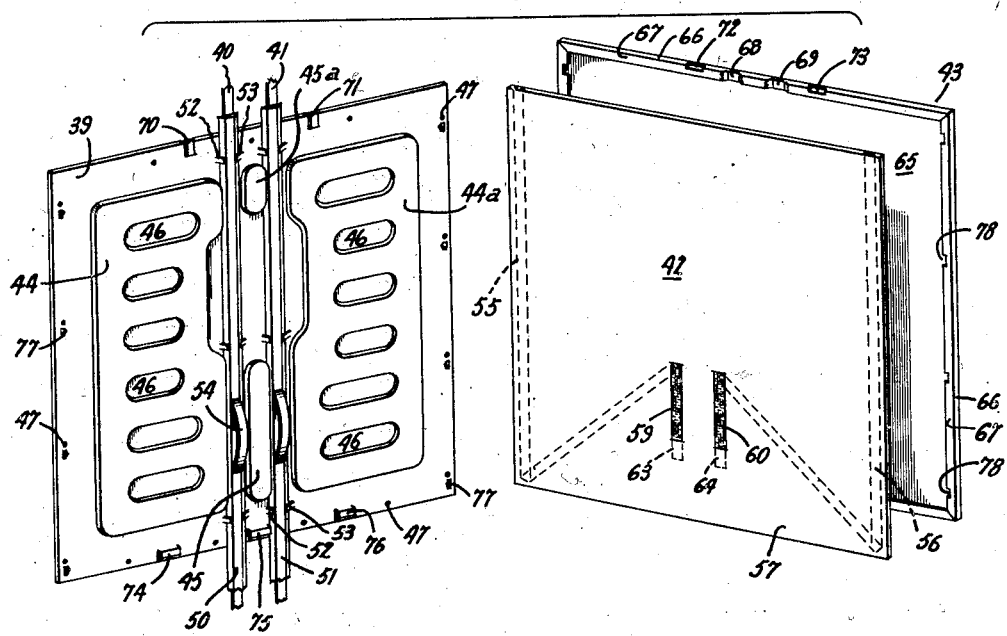
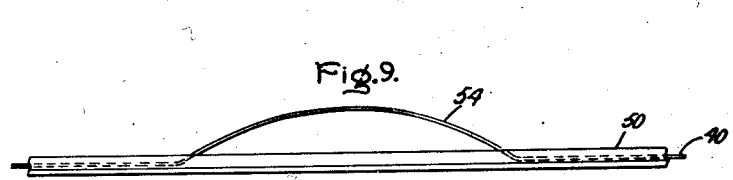
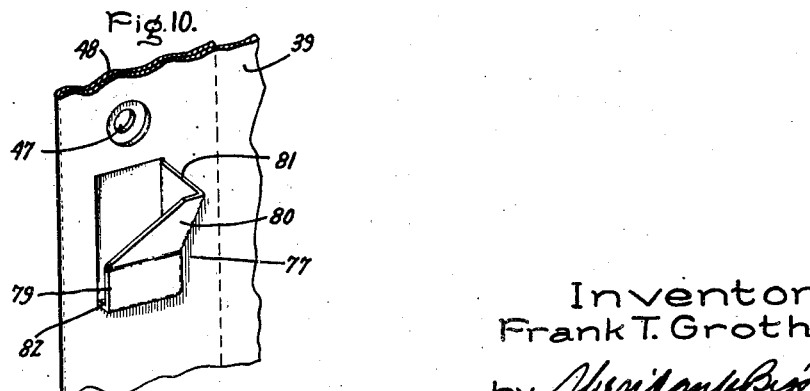
Inventor:
Frank T. Grothouse,
by
His Attorney.

March 28, 1950 F. T. GROTHOUSE 2,502,148
RADIANT PANEL HEATING APPLIANCE
Filed April 5, 1949 4 Sheets-Sheet 4
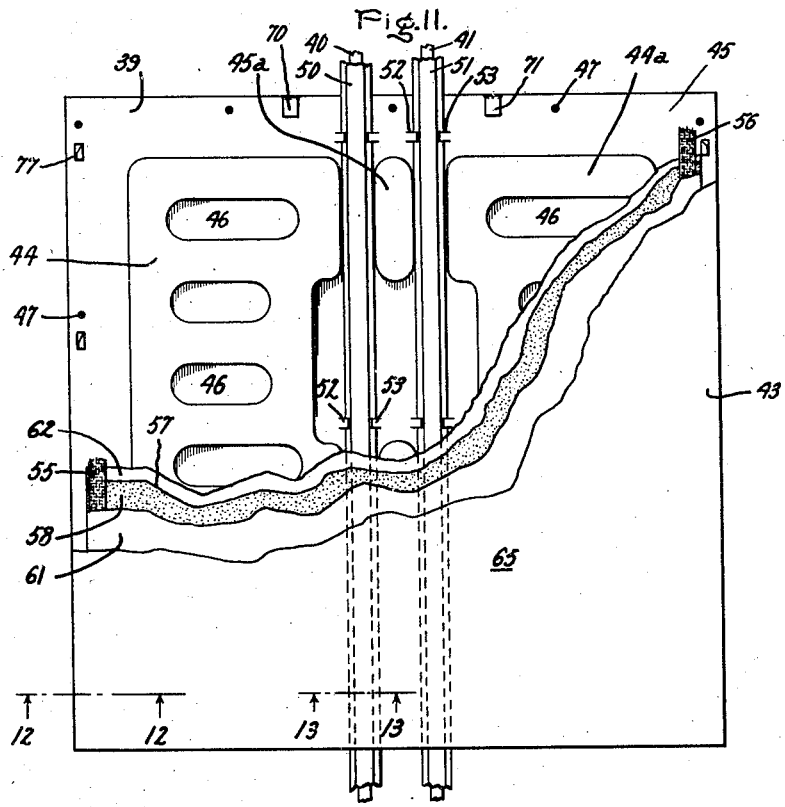
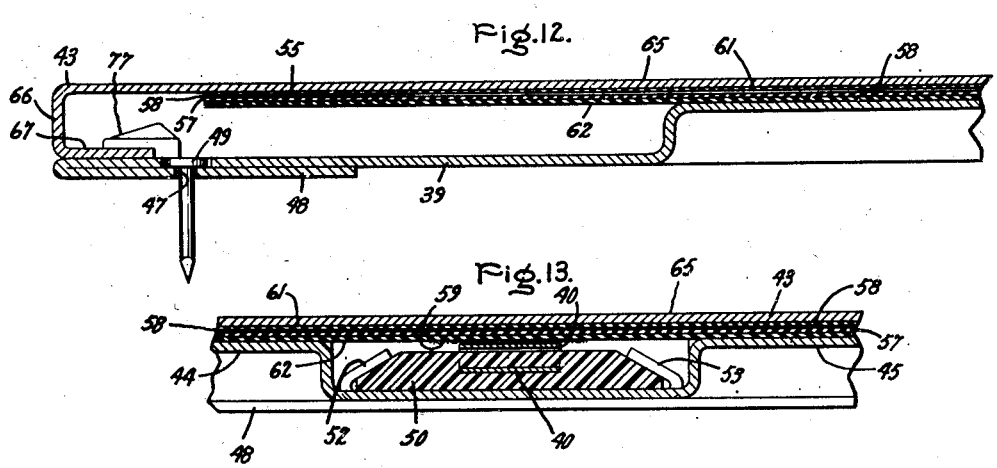
Inventor:
Frank T. Grothouse,
by *Sheridan & Biggs*
His Attorney.

Patented Mar. 28, 1950

2,502,148

UNITED STATES PATENT OFFICE 2,502,148

RADIANT PANEL HEATING APPLIANCE

Frank T. Grothouse, South Euclid, Ohio, assignor to General Electric Company, a corporation of New York Application April 5, 1949, Serial No. 85,662

10 Claims. (Cl. 219—19)

My invention relates to electric heating apparatus, and in particular to heating apparatus in the form of electrically heated panels for the radiant heating of an enclosed space.

In the art of heating enclosed spaces such as rooms and offices, it has been demonstrated that a highly satisfactory and efficient system is provided for warming the space and the occupants within the space by heating large areas on the surfaces enclosing the space. Such a heating system has the advantage of providing uniform heat radiation to all parts of the enclosed space, and an occupant of a room so heated by large warmed areas on the walls, ceiling, or floor will have the sensation of warmth, even though the ambient air temperature is relatively low, since the heated surfaces greatly reduce the rate of radiation of heat from the body. It is therefore a primary object of my invention to provide electrical heating apparatus in the form of thin, flat panels which may be attached to the interior surfaces of an enclosed space, such as a room, to provide uniform radiant heating to all parts of such space.

When heating by the use of electric energy, it is desirable that substantially all of the heat given off by the electrical heating element be used for heating the enclosed space and warming the occupants within the space since, generally speaking, the cost of electrical energy exceeds the cost of other sources of heat. It is therefore a further object of my invention to provide electric heating panels which prevent heat dissipation through the enclosing surfaces and direct the maximum amount of heat into the enclosed space.

Electrical panel heating systems, in order to be competitive with more conventional types of heating apparatus, must be economical in the first cost of the heating panels and related components necessary for a completed installation, and must provide a construction which is readily installed with the minimum of labor. Another object of my invention, therefore, is to provide an electrical heating panel construction such that the panels may be economically produced by mass production methods. Also an object of my invention is to provide a heating panel easily mounted on a surface, and which may be readily replaced in case of failure of the heating element or damage to any of the component parts.

A further object of my invention is to provide an electric heating panel which adequately protects the heating element from damage, and which protects the occupants of the room from contact with any of the electrical system.

Another object of my invention is to provide a convenient construction for supplying electrical power to each panel.

A feature of the invention which is useful in fulfillment of the foregoing objects consists of a heating panel construction having a separate sole plate for attachment to a surface to be heated and upon which power supply buses are mounted, and having a panel case quickly attachable to the sole plate, with an electrical heating element completely enclosed by the panel case and sole plate. Another feature of the invention is in the construction of a sole plate for the panel with a reflecting surface to minimize the loss of heat, and to reflect substantially all of the heat into the space being heated. A further feature of this invention consists of an improved bus bar and heating element construction, spring contact portions of the bus bars engaging surface contact tabs on the electrical resistance element, and the bus bars extending from a power supply line to several aligned panels with spaced insulating portions at the points where the bus bars pass from one panel to an adjacent panel.

My invention will be better understood from the following description taken in connection with the accompanying drawings, and its scope will be pointed out in the appended claims.

Referring to the drawings, Fig. 1 illustrates a portion of the wall of a room with several panels and bus bars installed; Fig. 2 is a cross-sectional view taken on the line 2—2 of Fig. 1; Fig. 3 is a plan view of a heating panel, showing one embodiment of my invention, with portions of the panel cut away to show details of construction; Fig. 4 is an exploded view in perspective of one form of a heating panel with bus bars in accordance with my invention; Fig. 5 is a perspective view of a portion of two adjacent panels with a terminal bus in position; Fig. 6 illustrates a portion of a heating element for a panel in accordance with one embodiment of this invention; Fig. 7 is an exploded view in perspective of another form of heating panel construction in accordance with my invention; Fig. 8 illustrates a portion of a bus bar at an intermediate stage in its manufacture; Fig. 9 illustrates the completed bus bar shown by Fig. 8; Fig. 10 illustrates in perspective one of the struck-up projections on the sole plate for the mounting of the panel case; Fig. 11 is a plan view, with surfaces partially broken away, of a completed panel made in accordance with the embodiment shown by Figs. 7 through 10; Fig. 12 is a cross-sectional view taken on the line 12—12 of Fig. 11; Fig. 13 is a cross-sectional view taken on the line 13—13 of Fig. 11.

Referring to the drawings, a portion of a completed installation is shown by Fig. 1 with a plurality of radiant heating panels 1 installed on a wall 2 of a room or other enclosed space. A conventional base board 3 extends along the lower part of wall 2, it being understood that this baseboard may be in the form of a conduit for concealing electrical power supply lines through which electrical power is supplied to the heating panels 1.

The details of the construction of each panel and of the bus bars for supplying power to each panel will be more readily apparent by a reference to Figs. 2 through 6. For attaching the panels to a surface, each panel has a sole plate 4, shown in detail by Figs. 4 and 5. Sole plate 4 may be attached or fixed to the surface to be heated by any suitable fastening devices, such as nails or screws passing through apertures 5 into wall 2. The sole plate 4 is made preferably of metal, so that it will have the requisite strength and rigidity; and its outward surface, the surface away from the wall upon which the panel is mounted, is given a bright polished finish, so that the heat from an electrical resistor within the panel will be reflected outwardly and will not be dissipated through the sole plate into wall 2. Along two opposite edges of sole plate 4, a series of struck-up clips or latches 6 are provided for the ready assembly of the panel case to the sole plate as will be more fully explained later. The clips 6 on sole plate 4 may be formed by a simple punching and stamping operation. Bus bars 7 and 8 are anchored to the sole plate 4, and for this purpose ears 9 and 10 are struck-up from sole plate 4 near each corner. The ears 9 and 10 may be bent inwardly to form clips for anchoring the bus bars in position.

As an aid in aligning adjacent panels with one another, one edge of each sole plate 4, such as the lower edge, is provided with a slightly offset flange 11. The amount of the offset for flange 11 is the thickness of the sole plate, so that each sole plate can be in firm contact with the surface upon which the panels are mounted. Along the edge opposite offset flange 11, notches 12 and 13 are provided at the corners. Thus, as shown in Fig. 5, with the lower panel sole plate in position and the notched corners 12 and 13 along its upper edge, the next adjacent sole plate 4 may be mounted above with its offset flange 11 overlapping the sole plate of the lower panel, and the corners of the upper panel will lie within notches 12 and 13 to insure proper alignment.

After all of the sole plates for the entire installation have been mounted in position, the bus bars for supplying power to each panel are installed. Each bus bar is in the form of a continuous strip of resilient electrical conducting material, such as phosphor bronze. In stallations where the heating panels are installed on a wall, the bus bars extend from the lower edge of the lowermost row of panels to the upper edge of the top row of panels and connections may be made to the power supply lines at either the lower or upper edge. Two bus bars 7 and 8 are associated with each row of panels so that the heating elements of the panels are connected in parallel. Therefore if there is a failure of the electrical circuit in any one panel, this will not affect the supply of power to adjacent panels.

At spaced points along each bus bar, it is enclosed within an insulator 14. The spacing of insulators 14 corresponds to the panel dimensions so that each bus bar is completely insulated at the point where it extends from one panel to the next adjacent panel. Insulator 14 may be made up from two plates of insulating material preformed to the proper shape, with one plate applied to each side of the bus bar; or insulator 14 may be of a suitable thermo-setting plastic molded in position on the bus bar. Anchor holes 15 are provided for the reception of a rivet or other fastening device to anchor the bus bar to the insulator. Such anchor holes are not essential, however, if insulator 14 is molded in position. Between the insulators 14, each bus bar is provided with a bowed portion, and it is this portion of the bus bar which makes contact with the heating element.

In the assembly of the bus bars on the installed sole plates 4, a preformed insulator 16 is mounted on the sole plate for each of the bus bars. Insulator 16 preferably is of heavy impregnated paper with its intermediate portion in the form of a channel having flanges 17 and 18 projecting outwardly from the exposed face of sole plate 4. This channel portion is adapted to receive the exposed intermediate portion of each bus bar to insure that the bus bar is insulated from the metal sole plate. After insulating channel 16 has been mounted on the sole plate, the bus bar with its insulators assembled thereon is ready for installation. Each insulator 14 is provided with notches 19 and 20 adjacent each end. The bus bar is placed in position on the sole plates 4 with the series of notches 19 and 20 in alignment with and under the pairs of struck-up ears 9 and 10. Ears 9 and 10 thus anchor the bus bar assembly in position. Notches 21 are provided in the offset flange 11 on each sole plate so that the bus bar insulator 14 may lie in contact with the face of sole plate 4 at the point where the insulator extends from one panel to an adjacent panel.

In the embodiment shown in Figs. 2 through 6, the electric heating element 22 is constructed by cementing a layer of metallic foil 24, such as lead foil, to an insulating backing 25, and cutting the legs of a grid through the foil and partially through the insulating backing. The completed heating element 22, the back side of which is shown by Fig. 4, is illustrated in detail by Fig. 6. When the layer of metallic foil 24 is cemented to the backing 25, contact tabs 23 are folded over onto the back side of the insulating backing, and these contact tabs 23 are adapted to contact the bus bars 7 and 8 for the supply of electrical power to each heating element. To form the heating grid, a slitting cutter, such as a 45-degree cutter, is used to slit the foil 24, each cut starting from an edge of the foil and extending to a point slightly short of the opposite edge of the foil. The cuts are made starting from alternately opposite edges of the foil, thus forming the legs of the heating grid. The slitting cutter is set to cut completely through the foil 24 and partially through the insulating backing 25 upon which this foil is mounted. For additional protection of the layer of metal foil 24, it is preferable to cement to the surface of the grid an insulating sheet of thermoplastic, which upon application of heat and pressure will fill the slots 26 to maintain the slit edges of the foil permanently separated. By such a construction an easily fabricated and low cost heating element is provided which is readily mounted within the heating panel.

In accordance with this construction practically all of the installation work is performed without handling the heating elements 22 or the heating panel case 28, since the sole plates and bus bars are installed in proper position before the heating elements or the panel cases are attached. Prior to the mounting of heating element 22 on sole plate 4, it is preferable to place an insulating board 27 over the exposed surface of the sole plate. The insulating board 27 serves as an additional protective element to prevent a short circuit from the heating element to the sole plate and also to provide additional heat insulation to prevent loss of heat to the wall surface. The insulating board 27 should be of a proper thickness to maintain the heating element in proximity with the inside of the panel case as will appear later.

After the sole plate has been mounted on the wall surface, the bus bars have been installed, and the insulating board 27 is in position, heating element 22 is placed over the sole plate and insulating board with the contact tabs 23 on the back side of heating element 22 so oriented as to make contact with the bowed portions of bus bars 7 and 8. Upon attachment of the cover 28 to sole plate 4 the panel is then in its completed form.

The panel case or cover 28 is in the form of a shallow pan having a panel surface portion 29. Along two opposite sides of the case 28, narrow side walls 30 are provided, and extending from each side wall is an inwardly directed lateral flange 31 bent over from the side wall. These lateral flanges 31 have a series of elongated apertures 32 which cooperate with the struck-up latches or clips 6 on the sole plate for mounting of the panel case 28 on the sole plate. The lower edge of the panel case, as shown by Fig. 4, is provided with a narrow wall portion 33 having spaced outwardly extending flanges 34. Along the upper edge of panel case 28, a narrow wall portion 35, notched out at spaced intervals as shown at 36 is provided. Adjacent each notched out portion 36, the narrow side wall 35 has an inwardly extending lateral flange 37. Thus the upper edge of the panel case, shown by Fig. 4, is adapted to receive outwardly extending flanges 34 along the lower edge of a panel case installed next above, with the outwardly extending flanges 34 of the upper case fitting in the notched out portions 36 of the lower case, to insure proper alignment of the panel cases.

In final assembly, a case insulator 38 is employed between the metallic layer 24 of the heating element and the inside of the panel case 29 to effectively insulate the heating element from the case. This insulator may be of any suitable material such as pressboard, impregnated with a suitable insulating compound. As an alternative arrangement, the panel case and heating element may be prefabricated as a unit, so that when the sole plate and bus bars are installed, this unit can be attached to the sole plate to complete the panel.

After all of the heating panels have been installed on any given surface, connections are made from an electrical supply line, not shown, to the bus bars 7 and 8 to supply electrical power to each panel.

In Figs. 7 through 13, I have shown an alternative embodiment of my invention. In particular, in Fig. 7 the principal components of the heating panel are sole plate 39 with bus bars 40 and 41 thereon, a heating element 42, and a panel case 43. The completed panel appears as shown by Fig. 11 with the various portions of the panel broken away to show the details of construction.

Referring in particular to the sole plate 39, it is fabricated from sheet metal cut to an appropriate size corresponding to the desired panel size and shape. These panels may be made in any size or shape; however I have found it desirable to employ a rectangular configuration, and by using a panel approximately 16 inches square, the desired flexibility is achieved so that such panels may be readily adapted to any given installation. After sole plate 39 has been cut to the proper size, it is placed in a press and embossed portions 44, 44a, 45 and 45a are formed, raising these portions up from the exposed surface or face of the sole plate as it is mounted on a wall or other surface. Within the embossed portion 44 and 44a, spaced areas 46 are not embossed, and hence there areas 46 appear as depressions on the exposed face of the sole plate. The embossed portions 44, 45 and 45a form a channel on the sole plate to receive the bus bar 40; and likewise the embossed portions 44a, 45 and 45a form a channel for bus bar 41. A further purpose of the embossed portions, particularly the portions 44 and 44a, is to reduce the amount of insulation required between the sole plate 39 and the heating element 42. The depressed portions 46 serve to increase the rigidity of sole plate 39 and also to increase the surface area on the back side of the sole plate so that it will rest firmly on the wall or surface upon which the panel is mounted. Sole plate 39 is also provided with a series of apertures 47, through which fastening devices such as screws or nails may pass for mounting the sole plate on the wall. The preferred form for the mounting apertures 47 is best shown by Fig. 12. The edge portion 48 of sole plate 39 is bent over on itself to provide a double thickness of metal around the edges of the sole plate. With this construction, aperture 47 may be provided with a portion of increased diameter to receive the head of the screw or nail 49. Thus the exposed surface of the sole plate is free from objectional projections which would otherwise result from the exposed heads of the fastening devices.

The bus bars 40 and 41, encased by insulation 50 and 51, are held in position on the sole plate by clips which form a part of the sole plate. Each of these clips consists of a pair of ears 52 and 53 struck up from the sole plate. In a completed installation, the bus bars 40 and 41 extend from a power supply source through a plurality of panels. For convenience it is preferable to fabricate the bus bars in a continuous strip so that sections of appropriate length may be cut at the point of installation. Referring to Figs. 8 and 9, each bus bar is made from a conducting strip of resilient material 40 encased in insulation 50. It has been found that phosphor bronze is a suitable material for the conductor 40, and the insulation is preferably of plastic which may be extruded. In the process of extrusion of the bus bar 40 and the insulation 50, a cam actuated guide may be used to periodically bring the conductor 40 to the outside of the insulation in order to provide an exposed contact surface. Assuming that the bus bars are being fabricated for use with heating panels 16 inches square, in the manufacture of the bus bar, the conductor will be brought to the surface of the insulation at sixteen inch intervals. The bus bar contact portions 54 which are thus exposed should have a length of approximately 2 inches. After the extrusion process, the exposed portion 54 of bus bar 40 is bowed upwardly, as shown by Fig. 9, to provide a resilient contact portion.

In this embodiment, any type of resistance element may be used which is in the form of a thin flat plate with a conducting film or layer on one side, and electrical contact portions on the other side. It has been found that a highly satisfactory element results from the use of graphite flakes in a silicone resin sprayed as a film on an insulating board. In the embodiment shown by Figs. 7 through 13, a board 57, of fiber or other insulating material, is employed and contact strips 55 and 56, of brass wire cloth or other suitable conducting material, are sewed along two opposite edges of the insulating board 57. The conducting film 58, of graphite-flakes or powder in a silicone resin, is then sprayed on one surface of the insulating board 57. The strips 55 and 56 of brass wire cloth provide the means for conducting electrical power to the conducting film 58, and the lower ends of strips 55 and 56 are folded over and fastened along the surface of insulating board 57 opposite conducting film 58. The ends of brass wire strips 55 and 56 are located and mounted on the back side of the insulating board 57 to provide the contact portions 59 and 60. A thin layer of insulating material 61 is cemented over the conducting film 58, and likewise a thin layer of insulating material 62 is cemented over the other surface of the insulating board. The insulating layer 62 on the back side, that is the side away from the conducting layer, of insulating board 57 has slots 63 and 64 provided therein for the mounting of the contact strips 59 and 60. Thus the completed element 42 consists of a resistor in the form of a thin layer of conducting material completely enclosed between insulating sheets, with two surface contacts 59 and 60 exposed on one side. The exposed contacts 59 and 60 of heating element 42 are so located that when heating element 42 is mounted on sole plate 39, exposed contacts 59 and 60 will be contacted by resilient portions 54 of bus bars 40 and 41.

The completed heating panel is enclosed and protected by panel case or cover 43 corresponding in size and shape to sole plate 39. After the sole plate has been mounted on a wall or other surface, and bus bars 40 and 41 have been attached to the sole plate by clips 52 and 53, heating element 42 and panel case 43 may be readily mounted on sole plate 39. The panel case 43 is in the form of a shallow pan having a surface portion 65, which forms the surface of the panel. Narrow side wall portions 66 are bent up from surface portion 65, and inwardly extending flanges 67 are bent over from side walls 66, with attaching flanges 67 substantially parallel to surface portion 65 of panel case 43. Along the upper and lower edges of panel case 43, notches 68 and 69 are provided in side walls 66 and flanges 67 for the reception of bus bars 40 and 41. The panel case 43 and sole plate 39 are arranged so that the case may be placed in position with respect to the sole plate, and by a simple movement case 43 is engaged by latches on sole plate 39 to lock the case in position. Along the upper edge of sole plate 39 a pair of catches 70 and 71 are provided which cooperate with a pair of elongated slots 72 and 73 along the upper edge of panel case 43. Similar catches 74, 75, and 76 may be provided along the lower edge of sole plate 39 for engagement with slots, not shown, along the lower edge of panel case 43.

Along the side edges of sole plate 39, as shown in Fig. 7, a series of latches 77 are provided for engagement with corresponding notches 78 provided along the inwardly extending flange 67 of panel case 43. The form of latches 77 is best shown by a reference to Fig. 10. Latch 77 is struck-up from the material forming sole plate 39 and it is designed to facilitate engagement of notches 78 with latches 77 when the panel case 43 is moved downwardly to lock it in position. Each latch has a flat portion 79 which is substantially parallel with the face of sole plate 39 and is sufficiently spaced therefrom to receive the inwardly extending flange 67 of the panel case 43. The flared portion 80 of latch 77 serves as a guide when panel case 43 is being moved into the engaged position. A side wall 81 is provided for latch 77 to provide the proper lateral alignment between panel case 43 and sole plate 39; and a bottom wall 82 is provided for the vertical alignment.

In both of the embodiments described above, an electrical heating panel construction is provided which is readily mounted on a wall or other surface with the minimum of labor in accomplishing the completed installation. The panel sole plates alone are first mounted on the surface. Therefore at this stage of the assembly, it is unnecessary to handle heating element 42 or panel case 43. No special fitting or on-the-job alterations are required in mounting of the sole plate, since each sole plate is of a uniform size and each sole plate simply may be nailed or screwed in position. Once the sole plates have been attached to the surface upon which the panels are being installed, the bus bars may be tied in to the power supply line, and only two bus bars are needed for any series of panels in a given row. The bus bars are readily affixed to the sole plate since the sole plate has been prefabricated with the upstanding ears in position for engagement with the insulated portions of each bus bar. The panel heating element and panel case for each panel are then ready for installation. No special attaching means are necessary for the mounting of the heating element since it is held in position within the enclosure formed by the sole plate and the panel case; and no special connections are required between the bus bars and the heating element since whenever the heating element is mounted in position contacts are automatically made between the bus bars and the terminals of the heating element. The panel case is mounted on the sole plate with the minimum of time and labor. It is merely necessary to place it in its proper position overlying the sole plate, and then by a slight movement, the cooperating latches on the sole plate and the panel case are engaged to maintain the entire assembly as a unitary heating panel.

While I have shown particular embodiments of the various phases of my invention, it will be understood, of course, that I do not wish to be limited thereto, since modifications may be made and I, therefore, contemplate by the appended claims to cover any such modifications as fall within the true spirit and scope of my invention.

What I claim as new and desire to secure by Letters Patent of the United States is:

1. An electric heating panel comprising a sole plate attachable to a surface, said sole plate having two sets of struck-up clips on the side away from said surface, an insulated heating element with terminals thereon, a cover cooperating with said sole plate to enclose said heating element, said cover having apertures cooperating with said one set of clips to attach said cover to said sole plate, and means for supplying power to said terminals, said means being attached to said sole plate by said other set of clips.

2. An electric panel heater comprising a resistor in the form of a thin layer of conducting material on one surface of an insulating backing, contact tabs for said resistor exposed on the other surface of said backing, a sole plate attachable to the surface to be heated for supporting said panel, bus bars affixed to and insulated from said sole plate, an insulating sheet covering said layer of conducting material, and a case attachable to said sole plate for enclosing said resistor and said bus bars, said bus bars contacting said tabs and extending outside said case for connection to a power supply source.

3. In electric heating apparatus of the panel type, a bus bar adapted to contact a surface terminal of the heating element in each of a plurality of such panels, said bus bar comprising an insulated conductor, said conductor having exposed resilient portions extending outside said insulation at longitudinally spaced points forming contacting elements to contact said surface terminals.

4. In an electric heating panel having an enclosing case and bus bars extending through said case and insulated therefrom, a heating element receivable within said case comprising an insulating board, and a thin layer of metallic foil secured to one side of said board with contact tabs on the other side thereof, said foil being cut along spaced parallel lines alternately from opposite edges substantially completely across said foil to form a long continuous electric circuit, said tabs making contact with said bus bars when said heating element is mounted within said case.

5. An electric heating panel comprising a sole plate attachable to a surface to be heated and having a heat reflecting finish on its side away from said surface, two sets of clips on said side of said sole plate, bus bars affixed to said sole plate by one set of said clips, said bus bars having portions thereof enclosed by insulation and exposed intermediate resilient portions, a heating element including a layer of metallic foil cemented to one side of an insulating backing, said foil being slitted from alternately opposite edges thereof to form a long continuous electrical circuit, means for making contact between said foil and said bus bar resilient portions, and a panel case having a panel surface portion and narrow side wall portions, said narrow wall portions including means cooperating with said second set of clips for attachment of said panel case to said sole plate, whereby said heating element is enclosed by said sole plate and said panel case, said bus bars extending outside said panel for connection to a power source.

6. In an electric heating panel including a panel housing and power supply means supported by said housing, a heating element comprising a sheet of insulation, conducting strips attached along two opposite edges on one side of said sheet and extending to the other side of said sheet, a conducting film on said one side, an insulating layer over said film substantially coterminous with said sheet, and a second insulating layer covering said other side of said sheet and said strips, said second layer having apertures to expose portions of said strips to provide terminals for said heating element, said heating element being constructed and arranged to be supported within said housing with said exposed portions making contact with said power supply means.

7. In an electric heating panel, a heating element having terminals thereon, bus bars for contacting said terminals and a housing supporting said bus bars and enclosing said heating element, said housing comprising a sole plate attachable to a surface for mounting said panel, said sole plate including embossed portions on the face thereof forming recessed channels for said bus bars, latching members on said sole plate, and a shallow pan-shaped cover having a surface portion and narrow side wall portions with inwardly directed flanges thereon, said flanges having slots cooperable with said latching members for attaching said cover to said sole plate, said cover and said sole plate supporting said heating element therebetween when assembled.

8. In an electric heating panel, a heating element having terminals thereon, bus bars for contacting said terminals, and a housing supporting said bus bars and enclosing said heating element, said housing comprising a sole plate attachable to a surface for mounting said panel, latching members on said sole plate, and a shallow pan-shaped cover having latching members adapted to cooperate with said sole plate latching members.

9. An electric heating panel comprising a sole plate attachable to a surface to be heated, said sole plate having embossed portions on the face thereof and forming recessed channels thereon, latching members on said face, bus bars receivable within said recesses, means on said sole plate for affixing said bus bars thereto, each bus bar comprising a conductor having longitudinally spaced portions enclosed by insulation with exposed conductive portions interspersed therebetween, a heating element having a conducting film on one side and surface terminals on its opposite side, said terminals being oriented to contact said exposed portions of said bus bars when said element is positioned overlying said sole plate, a shallow pan-shaped cover having a panel surface portion and narrow wall portions with inwardly directed flanges on said wall portions, said flanges having slots engageable with said latching members, whereby said cover may be affixed to said sole plate to enclose said positioned element.

10. Electrical heating apparatus of the panel type comprising a heating element sealed between insulating layers with contact tabs exposed on the surface of one layer, a sole plate attachable to a surface for mounting said panel, said sole plate having a heat reflecting side away from said surface, resilient bus bars supported on and insulated from said side and oriented to establish electrical contact with said tabs, and a panel case attachable to said sole plate, said heating element being supported within said case with said one layer adjacent said heat reflecting side of said sole plate and said other layer adjacent said case.

FRANK T. GROTHOUSE.

REFERENCES CITED

The following references are of record in the file of this patent:

UNITED STATES PATENTS

| Number | Name | Date |
|---|---|---|
| 1,954,773 | Champion et al. | Apr. 10, 1934 |
| 2,418,557 | Reiser | Apr. 8, 1947 |